US007646817B2

(12) United States Patent
Shen et al.

(10) Patent No.: US 7,646,817 B2
(45) Date of Patent: Jan. 12, 2010

(54) ACCELERATING VIDEO DECODING USING A GRAPHICS PROCESSING UNIT

(75) Inventors: Guobin Shen, Beijing (CN); Lihua Zhu, Beijing (CN); Shipeng Li, Irvine, CA (US); Ya-Qin Zhang, Beijing (CN); Richard F. Rashid, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 10/402,882

(22) Filed: Mar. 28, 2003

(65) Prior Publication Data

US 2004/0190617 A1   Sep. 30, 2004

(51) Int. Cl.
    *H04N 7/18*   (2006.01)
(52) U.S. Cl. .............................. 375/240.25; 375/240.26
(58) Field of Classification Search ......... 348/700–729; 375/239–241
    See application file for complete search history.

(56) References Cited

U.S. PATENT DOCUMENTS

| 5,903,312 | A | | 5/1999 | Malladi et al. |
| 5,959,689 | A | * | 9/1999 | De Lange et al. ............ 348/571 |
| 6,058,142 | A | | 5/2000 | Ishikawa et al. |
| 6,226,695 | B1 | | 5/2001 | Kaiser et al. |
| 6,275,239 | B1 | * | 8/2001 | Ezer et al. .................... 345/473 |
| 6,310,921 | B1 | * | 10/2001 | Yoshioka et al. ....... 375/240.26 |
| 6,384,833 | B1 | | 5/2002 | Denneau et al. |
| 6,411,651 | B1 | | 6/2002 | Rose et al. |
| 6,937,245 | B1 | * | 8/2005 | Van Hook et al. ........... 345/546 |
| 6,952,211 | B1 | * | 10/2005 | Cote et al. ................... 345/473 |
| 7,034,828 | B1 | * | 4/2006 | Drebin et al. ................ 345/426 |
| 7,184,057 | B2 | * | 2/2007 | Stokes et al. ................ 345/600 |
| 7,219,352 | B2 | * | 5/2007 | Estrop ........................ 719/323 |
| 7,352,359 | B2 | * | 4/2008 | Zalewski et al. ............ 345/156 |
| 2004/0101056 | A1 | * | 5/2004 | Wong et al. ............ 375/240.25 |

FOREIGN PATENT DOCUMENTS

CN            1206164 A       1/1999

OTHER PUBLICATIONS

Shen, et al., "Accelerating Video Decoding Using GPU", Institute of Automation, Chinese Academy Science, 4 pages.

* cited by examiner

*Primary Examiner*—Andy S Rao
(74) *Attorney, Agent, or Firm*—Lee & Hayes, PLLC

(57) ABSTRACT

An accelerated video decoding system utilizes a graphics processing unit to perform motion compensation, image reconstruction, and color space conversion processes, while utilizing a central processing unit to perform other decoding processes.

39 Claims, 7 Drawing Sheets

Figure 1 - Prior Art

ACCELERATING VIDEO DECODING USING A GRAPHICS PROCESSING UNIT

TECHNICAL FIELD

This invention relates to video decoding and, in particular, to accelerating video decoding using a graphics processing unit.

BACKGROUND

Multimedia is the core of digital entertainment, and it usually requires very high processing power, especially for real-time applications. When real-time multimedia applications are implemented using a general purpose computer, the computer's central processing unit (CPU) is usually heavily loaded, and in many cases, the CPU cannot support a real-time multimedia application. For example, CPUs found in most standard household personal computers are not powerful enough to decode high definition video in real-time.

With the advance of silicon and computer graphics technologies, more and more inexpensive yet powerful graphics processing units (GPUs) are found in mainstream personal computers and game consoles. GPUs are specialized processors designed to perform two-dimensional and three-dimensional graphics operations. When a computer is performing non-graphics oriented operations (e.g., decoding an encoded video bitstream), the CPU may be heavily loaded, while the GPU is idle.

Accordingly, a need exists to leverage the power of the GPU for use in non-graphics applications.

SUMMARY

Utilizing a graphics processing unit to accelerate decoding of video bitstreams is described. An accelerated video decoding system receives an encoded video stream, performs portions of a decoding process using a central processing unit and performs other portions of the decoding process using a graphics processing unit. Specifically, the graphics processing unit is used to perform motion compensation processing, image reconstruction, and color space conversion.

BRIEF DESCRIPTION OF THE DRAWINGS

The same numbers are used throughout the drawings to reference like features and components.

DETAILED DESCRIPTION

Figure 1:
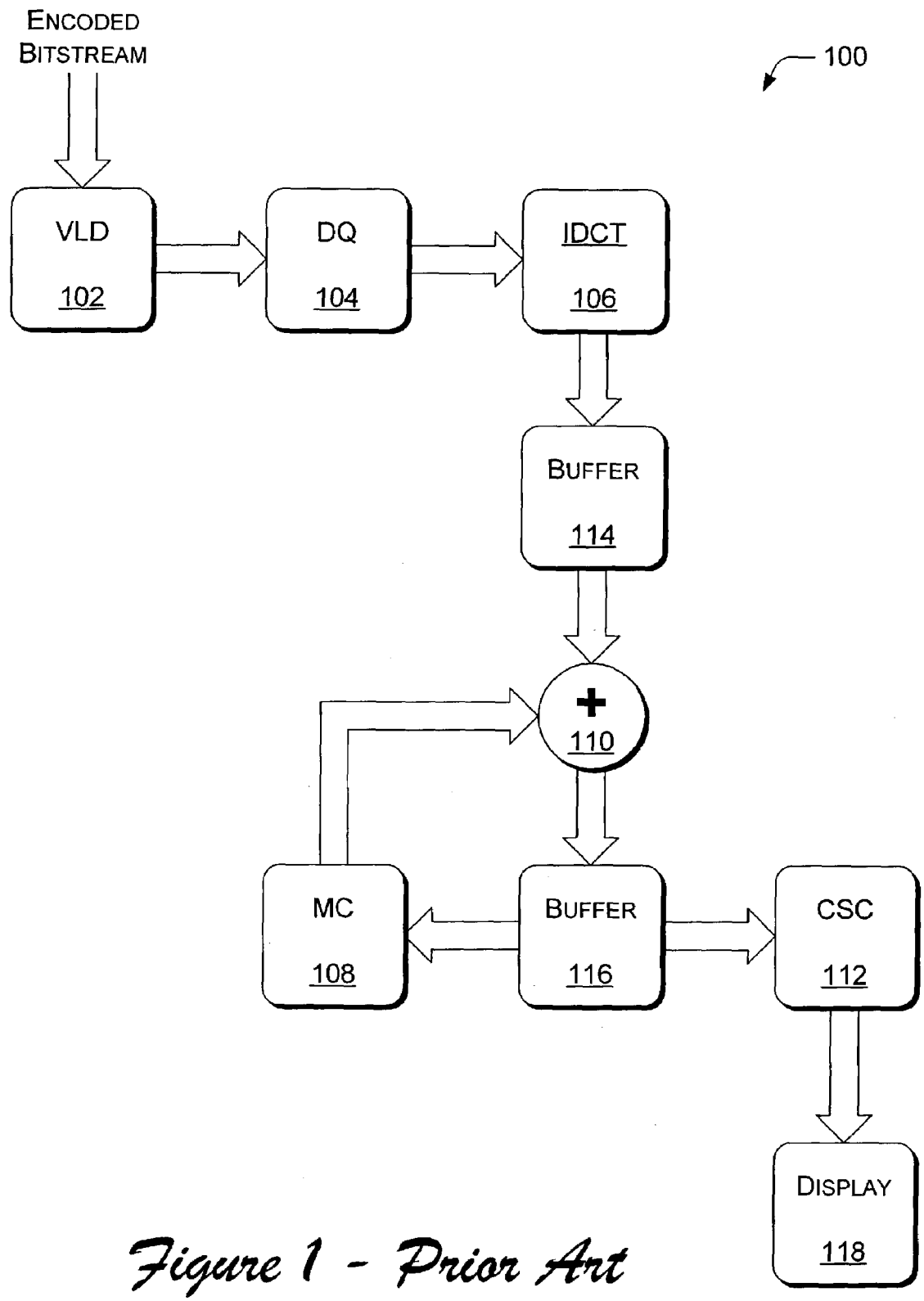
FIG. 1—Prior Art is a flow diagram illustrating an exemplary video decoding process.

The following discussion is directed to the use of a graphics processing unit (GPU) in support of non-graphics operations. Specifically, an example implementation is described in which a GPU is used to accelerate decoding of video bitstreams. GPUs are processing units that are specialized to perform graphics operations on a per-vertex basis (e.g., polygon based rendering) and/or on a per-pixel basis. In the described implementation, video decoding operations that are computationally intensive and are typically performed by a central processing unit (CPU), namely motion compensation, image reconstruction, and color space conversion, are performed by the GPU, thereby reducing the load on the CPU and accelerating the video bitstream decoding process.

Accelerated video decoding is described herein as it applies to video bitstreams encoded according to the Windows Media Video format, but the described process could also be applied to video bitstreams encoded according to other formats including MPEG and H.26x.

Streaming video is encoded as a sequence of frames, which may include any combination of intra-coded frames (I-frames), predicted frames (P-frames), and bi-directional predicted frames (B-frames). Each encoded I-frame includes all of the data necessary to generate and render a complete image. Generating an image from data in an encoded P-frame requires data from the P-frame and data from a previous I-frame or P-frame, called a reference frame. Generating an image from data in an encoded B-frame requires data from the B-frame as well as data from both a previous reference I-frame or P-frame and a future reference I-frame or P-frame. P-frames and B-frames may also be referred to as inter-coded frames.

Each encoded frame (I-frame, P-frame, or B-frame) is divided into macroblocks. A typical macroblock is an area that is 16×16 pixels in size. Depending on the size of the image, each frame may include many macroblocks. Because an I-frame includes all of the data necessary to display a complete image, if follows that each macroblock of an I-frame includes all of the data necessary to display a portion of the image represented by the macroblock (i.e., a 16×16 pixel portion of the image). As described above, a P-frame is predicted from a previous I-frame or P-frame. This means that at least one of the macroblocks of the P-frame relies on data in a corresponding macroblock of a previous I-frame or P-frame. Individual macroblocks of a P-frame or B-frame may be inter-coded or intra-coded. Inter-coded macroblocks rely on a reference macroblock while intra-coded macroblocks do not rely on a reference macroblock. An intra-coded macroblock contains all of the data necessary to generate a macroblock-sized portion of the image associated with the predicted frame. Accordingly, as described above, all of the macroblocks associated with an I-frame are intra-coded macroblocks. An inter-coded macroblock contains data that describes the difference between a portion of an image associated with the predicted frame and a corresponding portion of an image associated with a reference frame.

The data associated with an inter-coded macroblock typically includes a motion vector and difference data. A motion vector describes a two-dimensional transformation to be applied to a reference macroblock to align it with the predicted macroblock, while difference data identifies specific pixels that differ between the reference macroblock and the predicted macroblock.

Exemplary Video Decoding Process

FIG. 1—Prior Art illustrates an exemplary video decoding process 100. A typical video decoder receives an encoded bitstream, and processes the received bitstream by performing variable length decoding 102, dequantization 104, inverse discrete cosine transformation 106, motion compensation 108, image reconstruction 110, and color space conversion 112.

Variable length coding, discrete cosine transform, and quantization are well-known video encoding techniques which are used to compress a video bitstream before it is transmitted. Variable length decoding 102, dequantization 104, and inverse discrete cosine transformation 106 are well-known decoding techniques that are applied to a received encoded video bitstream to decompress the video data. Video may be encoded (and subsequently decoded) according to any combination of variable length coding, discrete cosine transform, quantization, and/or any other video encoding techniques.

In the described implementation, to improve system performance, video bitstreams are buffered, as indicated by buffer 114, after they are decoded.

Motion compensation 108 is a process in which a motion vector, which describes a two-dimensional translation, is applied to a macroblock of a reference frame. A motion vector is part of the encoded video bitstream and describes a two-dimensional location difference between data in a macroblock of a reference frame and data in a corresponding macroblock of a predicted frame. In the described implementation, each macroblock of a predicted frame has an associated motion vector.

In the described implementation, a macroblock is a block of pixels 16×16 in size. In alternate implementations, each macroblock can be described in terms of four 8×8 blocks such that each 8×8 block is assigned a motion vector. In such an implementation, each 8×8 block of a macroblock may be processed separately, but in the same way as macroblock processing is described herein. Accordingly, the discussion that follows describes processing performed at the macroblock level. However, it is recognized that the same processing may be performed on data blocks of other sizes as well.

As illustrated in FIG. 1, motion compensation 108 is performed on previously buffered reference data, as indicated by buffer 116, which is used to store previously decoded and reconstructed frame data to be used as a reference for subsequently received predicted frame data. If a reference frame is erroneously decoded or not received, then drifting errors are propagated to subsequent P-frames and B-frames that are predicted from the erroneous (or missing) reference frame. Accordingly, it is important that motion compensation processing 108 be performed accurately.

Reconstruction 110 is a process in which motion compensated reference frame data is added to received difference data (associated with a P-frame or a B-frame) to form a reconstructed image associated with a predicted frame. As indicated in FIG. 1, the reconstructed data may be buffered (as indicated by buffer 116) for subsequent use as reference data.

Color space conversion 112 is performed on the reconstructed data prior to display 118. Color space conversion processing 112 is performed to convert video data from a color space in which it was created to a color space that is associated with a display device on which the video data will be displayed. For example, a typical color space conversion may be from YUV format to RGB format.

Exemplary System Architecture and Methods

Figure 2:
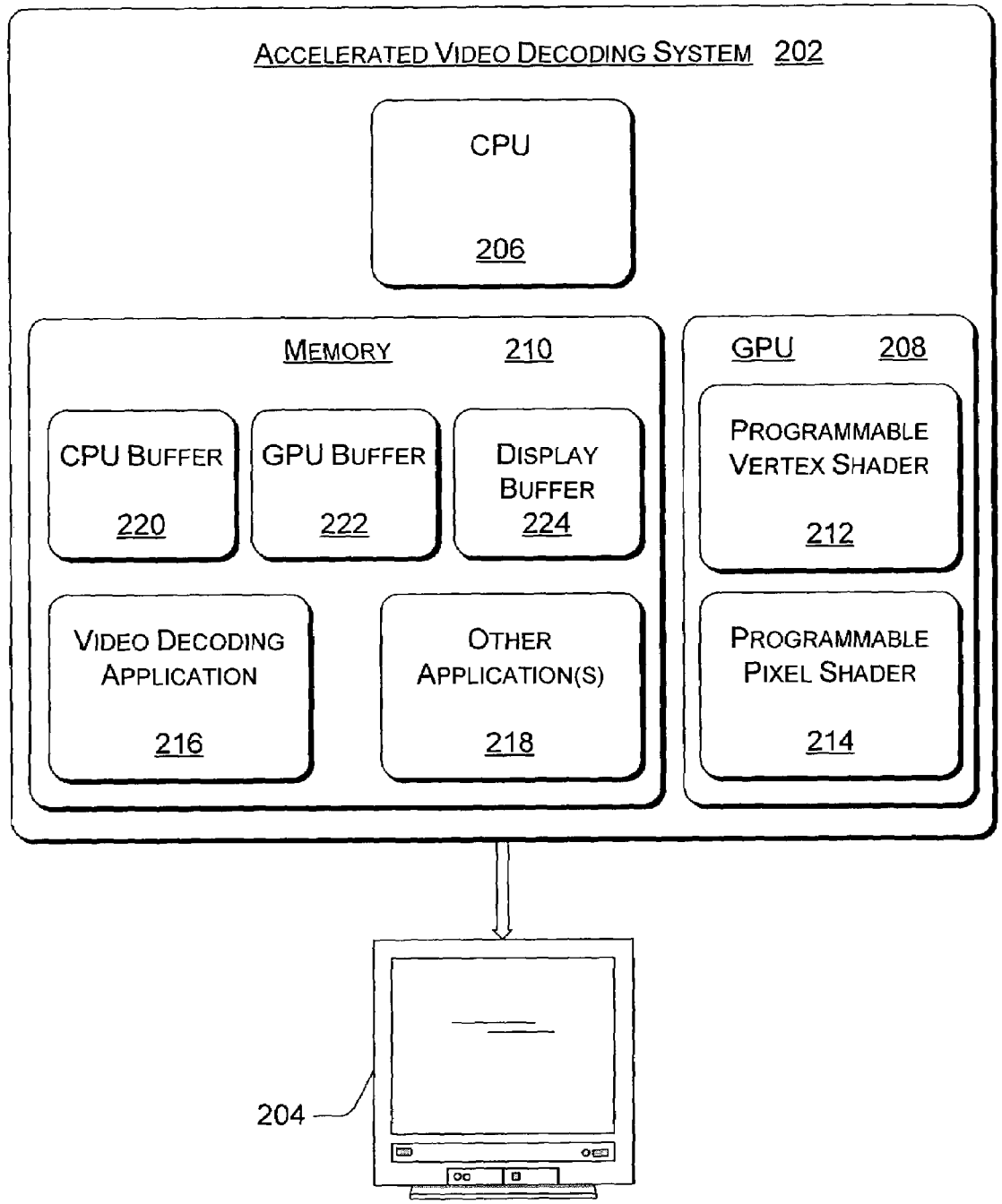
FIG. 2 illustrates an exemplary architecture of an accelerated video decoding system.

FIG. 2 illustrates an exemplary architecture of an accelerated video decoding system 202. Accelerated video decoding system 202 receives an encoded video bitstream, decodes the received data, and transmits the decoded data to display device 204. Display device 204 is representative of a television, a computer monitor, or other such display device. Although shown as a physically separate device, display device 204 may be implemented as an integrated component of accelerated video decoding system 202.

Accelerated video decoding system 202 is representative of a personal computer, video gaming console, or other such device configured to receive, decode, and render video data. Exemplary accelerated video decoding system 202 includes a central processing unit (CPU) 206, a graphics processing unit (GPU) 208, and memory 210. Exemplary GPU 208 includes a programmable vertex shader 212 for performing graphics operations on a per-vertex basis, and a programmable pixel shader 214 for performing graphics operations on a per-pixel basis.

Memory 210 is used to store video decoding application 216 and may also store other applications 218. Memory 210 may also include one or more buffers such as CPU buffer 220, which is accessible by CPU 206; GPU buffer 222, which is accessible by GPU 208; and display buffer 224, which is accessible by display device 204. Other applications 218 may be implemented to execute on either CPU 206 or GPU 208. Video decoding application 216 is implemented to direct CPU 206 to perform variable length decoding 102, dequantization 104, and inverse discrete cosine transformation 106. Video decoding application 216 is further implemented to direct GPU 208 to perform motion compensation 108, image reconstruction 110, and color space conversion 112. A method for utilizing GPU 208 to accelerate decoding of an encoded video bitstream is described in more detail below with reference to FIG. 3.

Exemplary Method for Accelerating Video Decoding

Accelerated video decoding may be described in the general context of computer-executable instructions, such as application modules, being executed by a computer. Generally, application modules include routines, programs, objects, components, data structures, etc. that perform particular tasks or implement particular abstract data types. Video decoding application 216 may be implemented using any number of programming techniques and may be implemented in local computing environments or in distributed computing environments where tasks are performed by remote processing devices that are linked through various communications networks based on any number of communication protocols. In such a distributed computing environment, application modules may be located in both local and remote computer storage media including memory storage devices.

Figure 3:
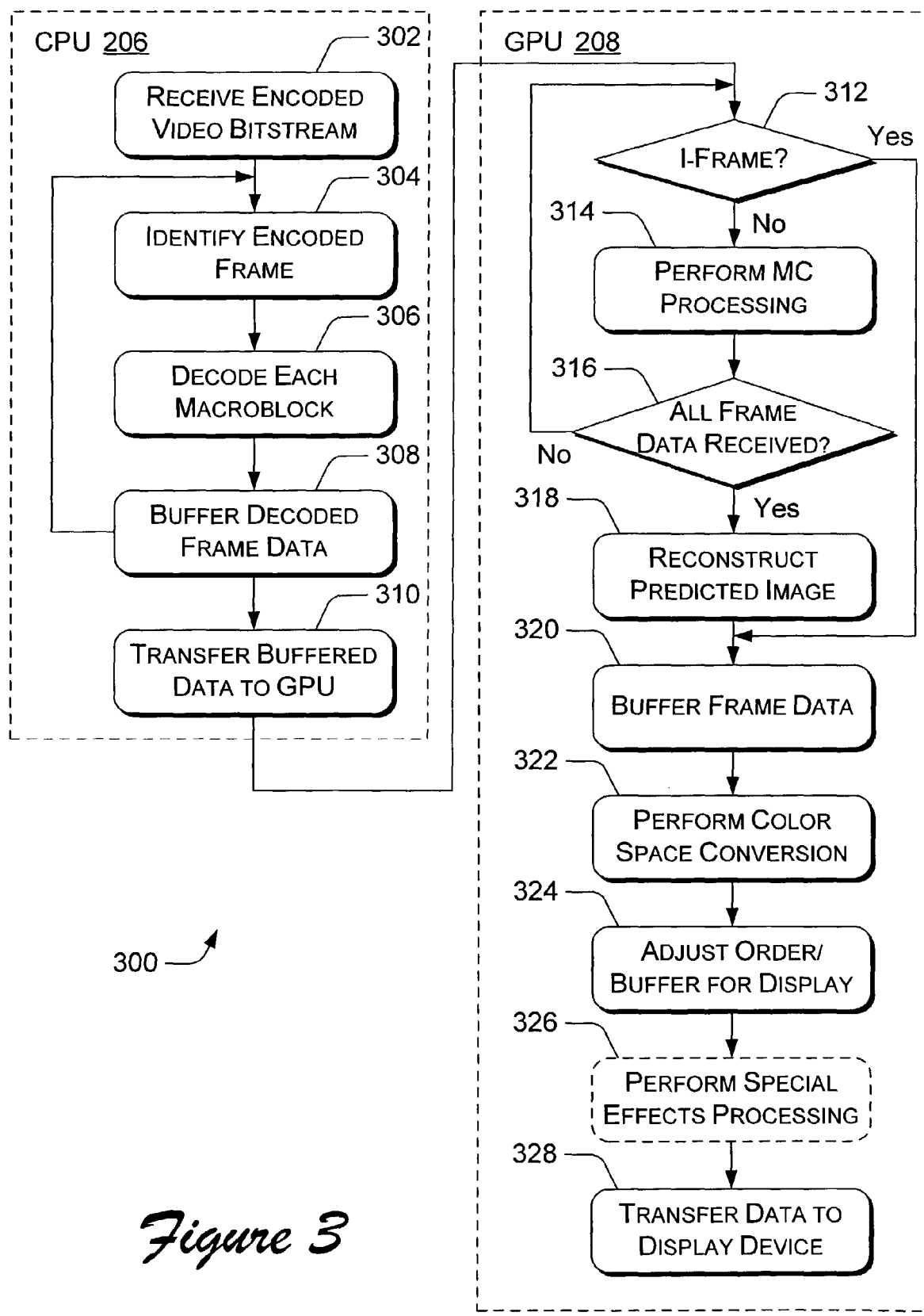
FIG. 3 illustrates an exemplary method for utilizing a graphics processing unit to accelerate video decoding.

FIG. 3 illustrates an exemplary method 300 for utilizing a graphics processing unit to accelerate video decoding. Blocks 302-310 represent processing performed by CPU 206, while blocks 312-328 represent processing performed by GPU 208.

At block 302, video decoding system 202 receives an encoded video bitstream. As mentioned above, the described implementation applies to video bitstreams encoded according to the Windows Media Video format. Alternate implementations may be configured to decode video bitstreams encoded according to other formats such as MPEG and H.26x.

At block 304, video decoding application 216 directs CPU 206 to identify an encoded frame in the received encoded video bitstream. The identified frame may be an I-frame, a P-frame, or a B-frame.

At block 306, video decoding application 216 directs CPU 206 to decode the identified frame by performing variable length decoding, dequantization, and/or inverse discrete transform on each macroblock of the identified frame. For an I-frame, the decoded data consists of actual image data, while for a P-frame or a B-frame, the decoded data represents the difference between one or more reference frame images and the image represented by the current P-frame or B-frame. The decoded data associated with each macroblock typically includes a motion vector and data that describes pixels that differ between a motion compensated reference image and the predicted image.

At block 308, video decoding application 216 directs CPU 206 to buffer the decoded data. In the described implementation, the decoded frame data is stored in CPU buffer 220. After buffering the decoded data, CPU 206 continues decoding additional frames as described above with reference to blocks 304-308. By buffering the decoded data, CPU 206 can continue decoding additional data while GPU 208 is processing previously decoded data, thereby improving system performance by utilizing both the CPU and GPU simultaneously.

At block 310, video decoding application 216 transfers data from CPU buffer 220 to GPU 208. In one implementation, to take advantage of available bandwidth, two or more macroblocks of difference data are packed together for transmission from CPU 206 to GPU 208. In one implementation, motion vector data is transferred from CPU 206 to GPU 208 separate from difference data.

At block 312, GPU 208 determines whether the data received from CPU buffer 220 is associated with an I-frame. If the data is associated with an I-frame, then no motion compensation or image reconstruction processing is needed, and processing continues at block 320 (the "Yes" branch from block 312), where the decoded data is stored in GPU buffer 222 to be used as reference data for subsequent predicted frames.

If the received data is associated with a P-frame or B-frame (the "No" branch from block 312), then at block 314, video decoding application 216 directs GPU 208 to perform motion compensation processing. GPU 208 applies a motion vector associated with a macroblock of the received frame data to a corresponding macroblock of previously buffered reference data. In the described implementation, different motion compensation modes are supported that vary depending on whether a received macroblock is inter-coded or intra-coded, and based on the value of an associated motion vector. Various motion compensation precisions are also supported, including integer-pel, ½-pel, and ¼-pel precisions. An exemplary motion compensation processing method is described in more detail below with reference to FIG. 4.

At block 316, video decoding application 216 determines whether or not all of the macroblocks associated with the current frame have been transmitted to GPU 208. If there is more difference data associated with the predicted frame currently being processed (i.e., all of the macroblocks for the frame have not been transferred to GPU 208), then processing continues at block 310 as described above. On the other hand, if all of the difference data for the predicted frame currently being processed has been transferred to GPU 208, then image reconstruction processing is performed at block 320, as described below. As described above, depending on the available bandwidth between CPU 206 and GPU 208, multiple macroblocks may be packed together when sent to GPU 208. In implementations in which CPU 206 decodes video data fast enough and the memory bandwidth between CPU 206 and GPU 208 is large enough, the macroblocks associated with a frame may be transmitted in a single batch, eliminating the need for repetitive processing indicated in FIG. 3 by the loop from block 316 to block 312.

At block 318, video decoding application 216 directs GPU 208 to reconstruct the image associated with the received predicted frame data. Image reconstruction is performed by adding motion compensated reference data to received difference data for each macroblock of the frame. An exemplary image reconstruction method is described in further detail below with reference to FIG. 5.

At block 320, video decoding application 216 directs GPU 208 to copy the reconstructed image data (or in the case of an I-frame, the received image data) to GPU buffer 222. The buffered image data can then be used as reference data for subsequently received predicted frame data. In the described implementation, B-frame data is not used as reference data for subsequent frames, and so, is not buffered at block 320.

At block 322, video decoding application 216 directs the pixel shader component 214 of GPU 208 to perform color space conversion processing on the reconstructed image. Color space conversion processing is performed pixel-by-pixel to convert an image from a color space in which it was created (e.g., YUV) to a color space supported by display device 204 (e.g., RGB). Because color space conversion applies to each pixel in an image, it is appropriate for the color space processing to be performed using the programmable pixel shader component 214 of GPU 208.

At block 324, the image data is copied to display buffer 224. At block 324, the display order of the frame data may also be adjusted. For example, because B-frames depend on data from both a previous and a future frame, the frames may be received and processed in an order that is different from the order in which the frames are to be displayed. At block 324, the display order is adjusted to restore the correct temporal ordering. This block is only applied to I- and P-frames and is only necessary when the sequence contains B-frames. This step is necessary because a B-frame depends on two references, one precedes it and one succeeds it temporally. Decoded frame data remains in display buffer 224 until a scheduled display time associated with the frame is reached. The amount of data that is buffered depends on whether the processing speed compared to the display speed. Buffereing the decoded data also reduces display jitter and allows the CPU and GPU to continue processing additional frames while previously processed frames are stored in display buffer 224.

At block 326, video decoding application 216 may optionally be configured to direct GPU 208 to perform special effects processing on the reconstructed image. For example, GPU 208 may be directed to perform vertex-based or pixel-based special effects processing such as de-interlacing, inverse telecine, scaling, fading in or out, and image sharpening or blurring.

At block 328, the decoded frame image is transmitted to display device 204.

Exemplary Motion Compensation Processing Method

Figure 4:
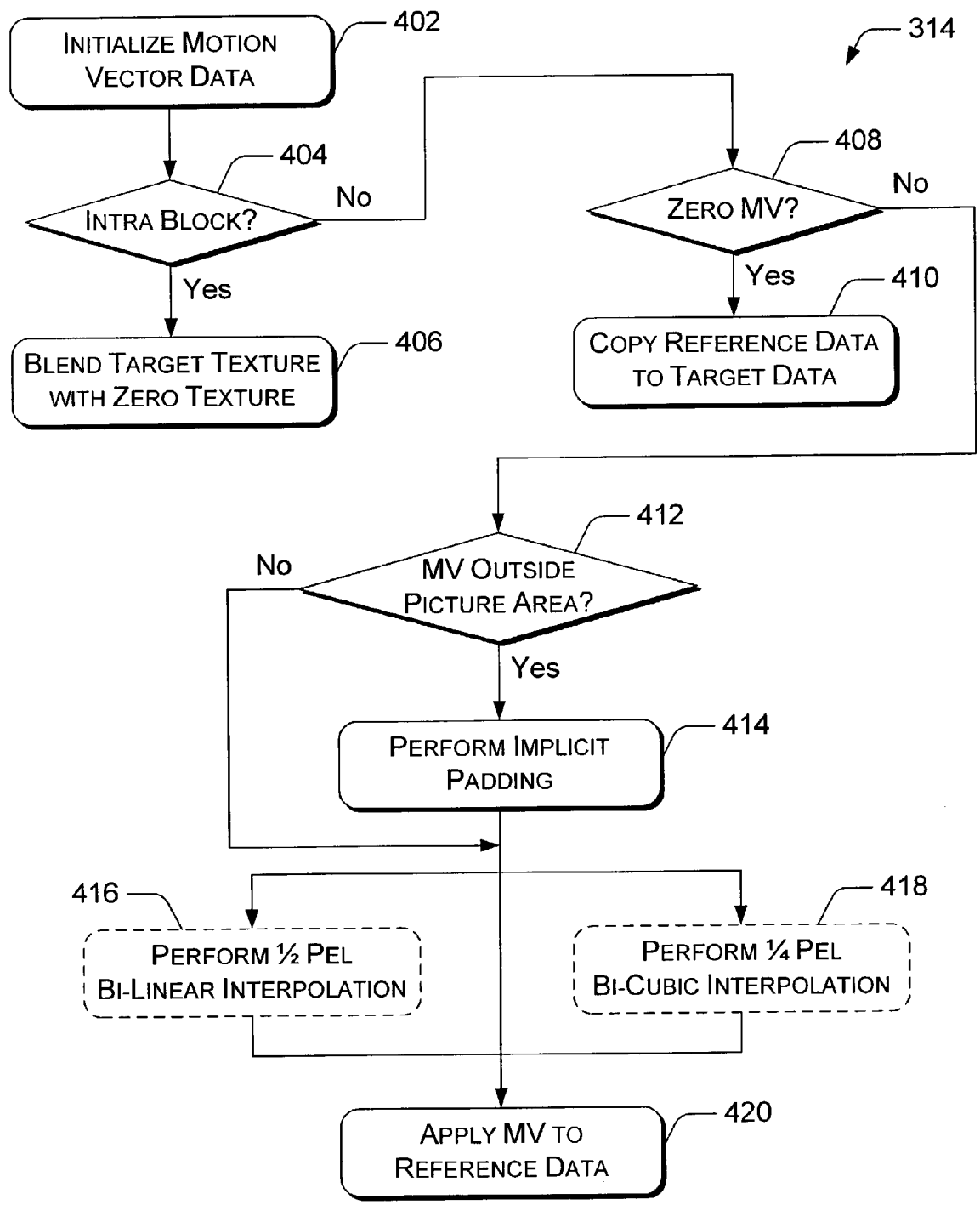
FIG. 4 illustrates an exemplary motion compensation processing method as performed by a graphics processing unit.

FIG. 4 illustrates an exemplary motion compensation processing method performed by GPU 208. The illustrated method may be performed by the GPU as described with reference to block 314 of FIG. 3.

As described above, in an exemplary implementation, a 16×16 macroblock can have one motion vector (i.e., a 1MV macroblock), or the macroblock may be divided into four 8×8 blocks, each having a motion vector (i.e., a 4MV macroblock). In the described implementation, each 8×8 block of a 4MV macroblock is processed separately, in the same way that a 1MV macroblock is processed. Method 314 is described with reference to a 1MV macroblock, but may also be performed for each smaller block of a 4MV macroblock.

At block 402, GPU 208 initializes motion vector data associated with a macroblock of a predicted frame such as a P-frame or a B-frame. Video decoding application 216 directs programmable vertex shader component 212 of GPU 208 to perform initial processing on the received motion vector data to generate vertex data. For the target macroblock (i.e., the macroblock to be reconstructed) the target position and texture address for each vertex (i.e., each of the four corner pixels) is determined. The target positions specify the position in the target texture of the macroblock to be reconstructed and is used for triangle setup. The texture addresses specify the position of a vertex of the corresponding macroblock in the reference frame. In one implementation, CPU 206 calculates the texture addresses by applying the motion vector to the target block positions and sends the texture addresses to GPU 208. In an alternate implementation, CPU 206 sends the motion vector to GPU 208 and vertex shader 212 is configured to calculate the texture addresses.

At block 404, GPU 208 determines whether or not the macroblock to be processed is an intra-coded macroblock. If the macroblock to be processed is an intra-coded macroblock (the "Yes" branch from block 404), then the received macroblock data is alpha blended with a zero valued texture (block 406). Because an intra-coded macroblock contains all of the data necessary to generate a complete 16×16 pixel area of the image, blending the received data with a zero valued texture results in a target texture that includes a complete 16×16 pixel area of the image that corresponds to the received macroblock.

In alternate implementations, intra-coded macroblocks are processed in the same way inter-coded macroblocks with a zero motion vector are processed (described below with reference to block 410). In such an implementation, because it is computationally expensive to zero out portions of a previously generated reference image, a previously cleared (i.e., the reference pixel values are set to zero) area outside of the picture area is used as the corresponding reference macroblock for an intra-coded macroblock.

In another implementation, motion compensation processing for the intra-coded macroblocks is performed by first clearing the target texture (i.e., setting each pixel value to zero) before processing any other macroblocks.

If the macroblock to be processed in an inter-coded macroblock (the "No" branch from block 404), then at block 408, GPU 208 determines whether or not the motion vector associated with the macroblock is equal to zero. If the motion vector has a value of zero (the "Yes" branch from block 408), then at block 410, the corresponding macroblock in the buffered reference data is copied to the target texture.

In an alternate implementation, motion compensation processing for a macroblock with a zero value motion vector can be performed in the same way that motion compensation processing is performed for a macroblock with a non-zero motion vector. However, in the described implementation, to simplify processing, macroblocks with zero motion vectors are processed differently than macroblocks with non-zero motion vectors.

If the macroblock to be processed is an inter-coded macroblock with a non-zero motion vector (the "No" branch from block 408), then at block 412 GPU 208 determines whether or not the motion vector points outside of the picture area. If the motion vector points outside of the picture area (the "Yes" branch from block 412), then at block 414, GPU 208 performs implicit padding.

At block 414, GPU 208 performs a padding process to handle the motion vector that points outside of the picture area. For example, if the motion vector associated with a macroblock at target location (0, 0), is (−3, −4), then the reference macroblock is at location (−3, −4) which is out of the picture area. To ensure that corresponding reference data exists within the picture are, a padding band, typically 16 pixels in width, is added to each side of the reference image. In the described implementation, padding is performed implicitly (at block 414) by configuring the render state and texture address mode of the textures in the GPU so that the DirectX will automatically perform the padding.

In an alternate implementation, padding is performed explicitly using a rendering pass as part of vector data initialization (block 402). That is, the four boundaries of the reference frame are explicitly padded using a rendering pass before motion compensation processing is performed. Vertex shader 212 is programmed to assign the same texture address to the added boundary pixels. Because the texture addresses of the vertices are used by the pixel shader to sample the pixel values, the same texture addresses will correctly set the corresponding reference pixel values to the desired boundary pixel value.

Depending on the precision with which the motion compensation is to be performed, the reference data may be interpolated using a bi-linear filter at block 420 to provide ½ pel precision, or may be interpolated using a bi-cubic filter at block 422 to provide ¼ pel precision. Achieving sub-pel motion compensation precision is described in further detail below. Integer-pel precision does not require additional filtering, which is represented in FIG. 4 by the arrow from block 414 to block 420.

At block 420, the motion vector associated with the macroblock to be processed is applied to the corresponding macroblock in the buffered reference data, and the motion compensated reference data is written to the target texture.

In an exemplary implementation, because conditional operations are computationally expensive in GPU 208, macroblocks are packed and sent to GPU 208 in batches based on motion compensation mode and motion compensation precision. For example, when intra-coded macroblocks are packed together, motion compensation processing performed by GPU 208 for those macroblocks can be described as above with reference to blocks 402 and 406 of FIG. 4. When inter-coded macroblocks with a zero motion vector are packed together, motion compensation processing performed by GPU 208 for those macroblocks can be described as above with reference to blocks 402 and 410 of FIG. 4. When inter-coded macroblocks with a non-zero motion vector and integer-pel precision are packed together, motion compensation processing performed by GPU 208 for those macroblocks can be described as above with reference to blocks 402, 412, 414, and 420. Block 416 represents additional processing performed for ½-pel precision motion compensation, and block 418 represents additional processing performed for ¼-pel precision motion compensation.

Achieving Sub-Pel Motion Compensation Precision

As described above, motion compensation processing differs for various precisions such as integer-pel, half-pel, and quarter-pel. Motion compensation precision refers to the precision of a motion vector. For example, a motion vector can describe the movement of a macroblock to the nearest pixel (i.e. integer-pel precision) to the nearest half-pixel (i.e., half-pel precision), or to the nearest quarter-pixel (i.e., quarter-pel precision). The complexity of the motion compensation processing computations varies according to the precision with integer-pel precision requiring the least complex computations and quarter-pel precision requiring the most complex computations. In an exemplary implementation, due to processing limitations of the pixel shader component of a graphics processing unit (which is typically limited to eight lines of code per rendering pass), motion compensation processing is batched according to the motion compensation precision.

In one implementation, sub-pel precision is obtained by summing neighboring pixel values and then dividing the result by an appropriate number. For example, four pixel values may be summed and then divided by four (e.g., using a bi-linear interpolation filter), resulting in half-pel precision. In the described implementation, pixel shader 214 provides four independent 8-bit channels corresponding to red, green, blue, and alpha. Because each channel is limited to 8-bits, each channel can represent a range from 0 to 255. It is likely that in the described example, the sum of four pixel values may be greater than 255, resulting in an overflow. To prevent such an occurance, the neighboring pixel values are first decomposed into quotients and residuals, for example, by dividing each value by 4. The quotients and residuals are then summed and divided respectively. The resulting quotient is then multiplied by the value that it was divided by (4 in this case) and added to the resulting residual value. Depending on the motion compensation precision and the interpolation filters, it may be appropriate to divide by 16, 32, or 64 to guarantee no overflow. For example, for quarter-pel motion compensation using a bi-cubic interpolation filter, the reference pixel values are decomposed by 16.

In an alternate implemenatation, sub-pel precision is obtained by multiplying neighboring pixels by respective weights and then summing the resulting values together. For example, four pixel values are each multiplied by 0.25, and the resulting values are then summed, resulting in half-pel precision. As described above, the internal precision of pixel shader is limited to a maximum of eight bits, and intermediate results are rounded, thus introducing rounding errors. However, because errors will be propragated to future frames, such error is not acceptable. To ensure a precise result, in the described implementation, rounding errors are merged. Specifically, the rounding errors introduced during the computations of quotients are calculated and propagated to the computations of residues. For example, suppose the reference pixel values are decomposed with regard to 16. To calculate the final value, the interpolation for the quotients and residues are calculated and summed. The rounding error for quatients is multiplied by 16 and added to the rounding error for the residues. Merging the rounding error for quotients into the calculation for residues ensures that rounding errors from intermediate calculations are not introduced.

In another alternate implementation, a look-up table is generated to store pre-calculated intermediate results. Interpolation coefficients may be highly irregular, such as those of a bi-cubic filter. Such irregular interpolation coefficients lead to complicated operations to be performed by GPU 208. The use of a lookup table can increase system efficiency, especially when interpolation coefficients are irregular, by enabling the pre-calculation and storage of at least some intermediate results. To ensure that the look-up table can be accessed by GPU 208, the look-up table may be implemented as a swizzled texture with a size equal to a power of two.

Exemplary Image Reconstruction

Figure 5:
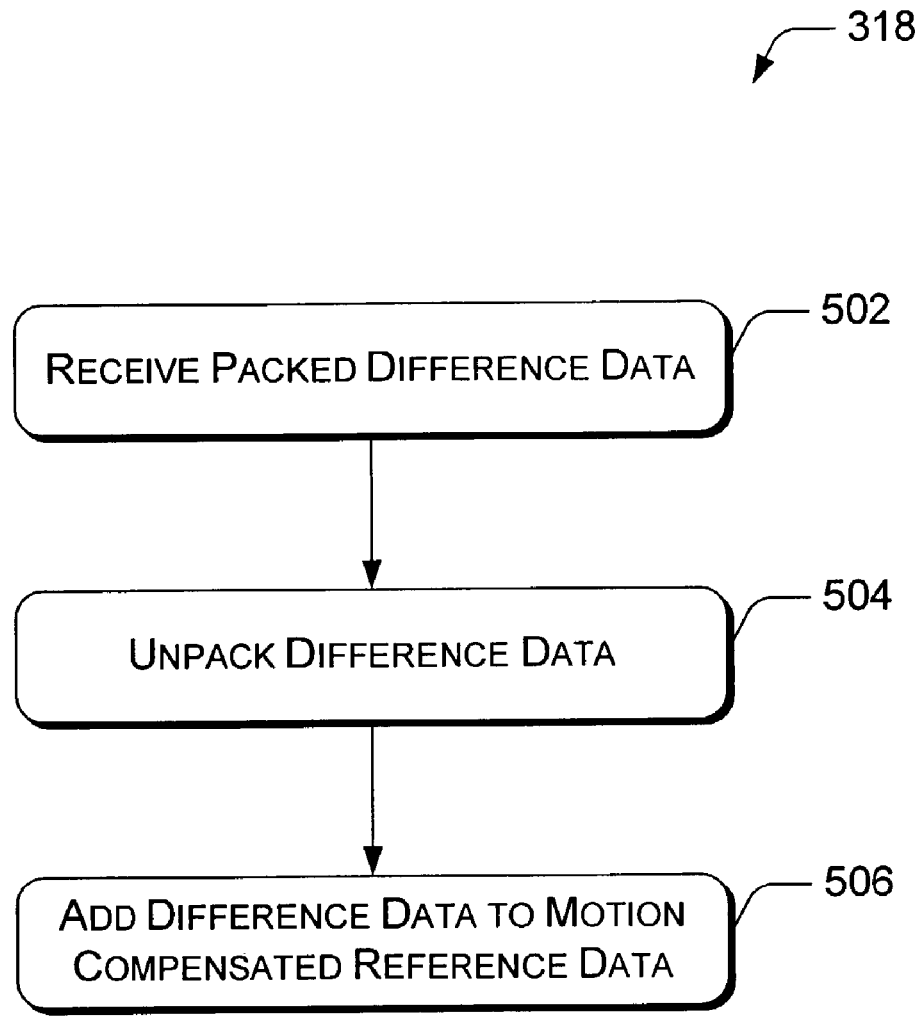
FIG. 5 illustrates an exemplary image reconstruction method as performed by a graphics processing unit.

FIG. 5 illustrates an exemplary image reconstruction method 318 that may be performed by GPU 208.

At block 502, GPU 208 receives difference data associated with a predicted frame such as a P-frame or a B-frame. As described above, in an exemplary implementation, to take advantage of available bandwidth, two or more macroblocks of difference data are packed together for transmission from CPU 206 to GPU 208.

At block 504, GPU 208 unpacks the received macroblocks of difference data. The macroblocks are unpacked in such a way as to preserve the original order of the packed macroblocks.

At block 506, the decoded frame data is added to the corresponding motion compensated reference data to generate a reconstructed image associated with the frame.

In the described implementation, each pixel of an image can be represented with an 8-bit unsigned number, and therefore has a value between 0 and 255. Difference data has a range of −255 to 255. Accordingly, nine bits are needed to represent the difference data. Image reconstruction processing is performed to add the received difference data to the corresponding reference data, resulting in a predicted image with pixels having values between 0 and 255.

In the described implementation, pixel shader 214 provides four independent 8-bit channels corresponding to red, green, blue, and alpha. Because each channel is limited to eight bits, each channel can represent a range from 0 to 255. The pixel shader can only support up to four textures in any rendering pass and the arithmetic instruction number can not exceed eight. Given the pixel shader limitations described above, predicted image reconstruction is not straightforward.

In the described implementation, the 9-bit signed difference data is stored using two 8-bit channels. One channel (e.g., the alpha channel) is used to hold the sign associated with the difference data and another channel is used to hold the difference data value. For each pixel, the value is both added to and subtracted from the reference data, and a conditional operation is then performed to select the appropriate result by examining the sign stored in the alpha channel.

Exemplary GPU Optimizations

The processing performed by GPU 208 to accelerate the decoding of video bitstreams can be optimized in many ways. Data merging, deliberate UV data placement, and data partitioning are three examples of processing optimizations that may be implemented.

Data merging can be used to reduce the load on vertex shader 212. Because pixel shader 214 processes data pixel-by-pixel, the load on pixel shader 214 for a particular frame is determined by the size of the image to be rendered. In contrast, vertex shader 212 processes data vertex-by-vertex. Accordingly, the load on vertex shader 212 for a particular frame is directly proportional to the number of data blocks to be processed for the given frame. For example, the load on vertex shader 212 for a frame with 20 macroblocks is twice the load as for a frame with 10 macroblocks.

In one implementation, to reduce the vertex shader processing load, neighboring macroblocks with equal motion vectors are merged together to form a larger data block to be processed. Similarly, neighboring intra-coded macroblocks (which have no motion vector) may also be merged together and processed as one data block.

Deliberate UV placement can be implemented to minimize the memory required to store data associated with an image. Many personal computer display cards require texture sizes to be equal to a power of two. For example, a 320×240 image would require a 512×512 texture. By considering texture size constraints when placing Y, U, and V image components on a texture, the smallest texture necessary can be used, thereby potentially reducing the memory footprint for the image.

Figure 6:
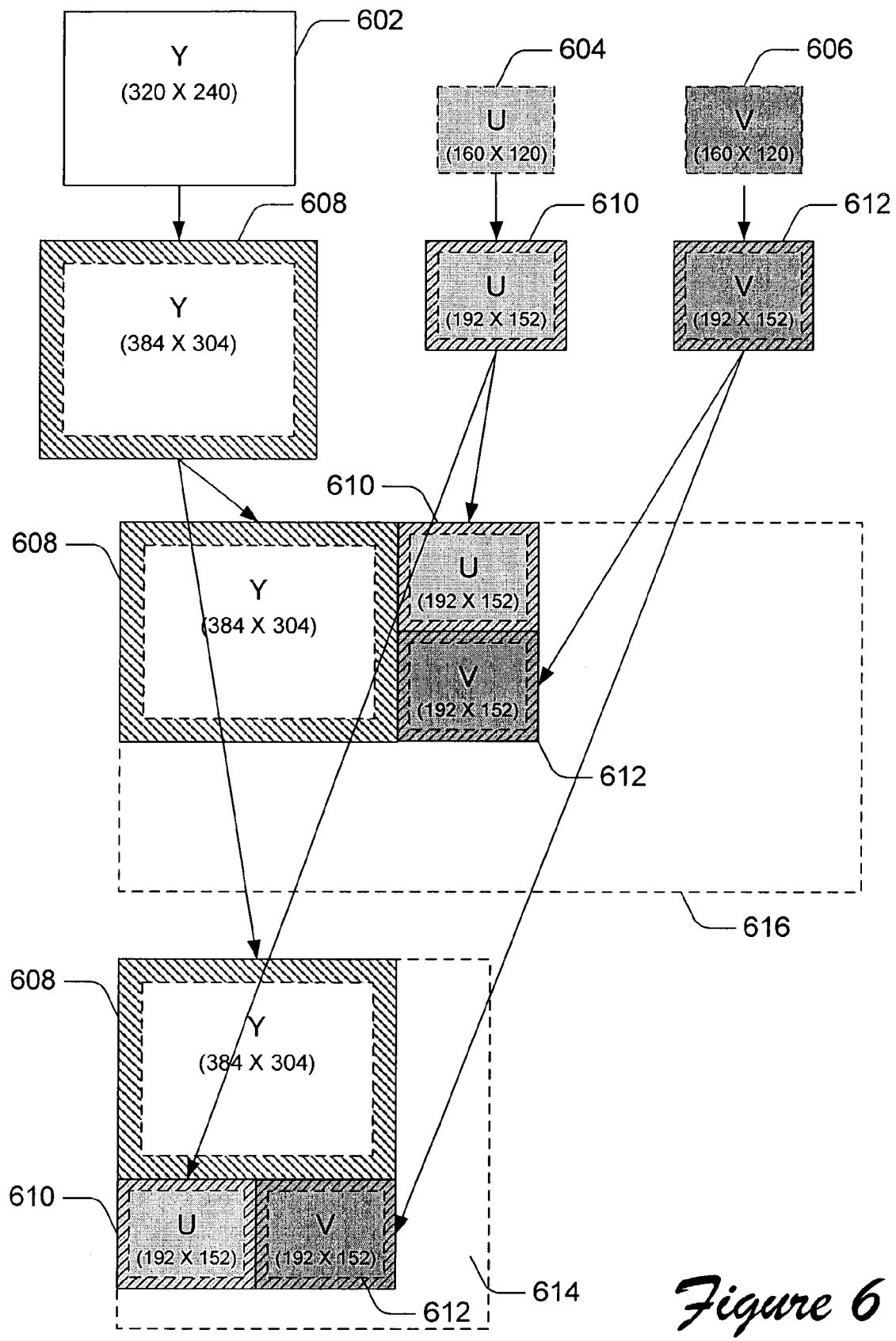
FIG. 6 illustrates exemplary UV component placement to minimize an image memory footprint.

FIG. 6 illustrates placement of Y, U, and V image components on a target texture to minimize required memory. An example 320×240 image is composed of a 320×240 Y component 602, a 160×120 U component 604, and a 160×120 V component 606. If each image component is padded (as described above with reference to block 414 of FIG. 4), padded Y component 608 is 384×304, padded U component 610 is 192×152, and padded V component 612 is 192×152.

If the U and V components are placed on target texture 614 beside Y component 608, then target texture 614 is required to be at least 1024×512. However, if the U and V components are places on target texture 614 below Y component 608, then target texture 614 is only required to be at least 512×512, providing a significant reduction in required memory to store the image. Therefore, in a preferred implementation, target size constraints are considered when U and V image components are placed on a target texture, to minimize the amount of memory required to store the image.

Data partitioning is another optimization that may be used to improve performance of GPU 208. In many systems that include a graphics processor, video memory, which is directly accessible by the GPU is typically limited. Therefore, it is foreseeable that the size of data associated with a large image may exceed available video memory storage. Memory bandwidth associated with GPU 208, typically referred to as accelerated graphics port (AGP) memory bandwidth, may also limit the amount of data that can be processed by the GPU. When GPU 208 attempts to read or write data that exceeds the AGP memory bandwidth, the GPU processing stalls because the data being read or written is too large. In an exemplary implementation, data associated with a large image may be partitioned into smaller data sets, each of which may be processed separately by GPU 208.

Figure 7:
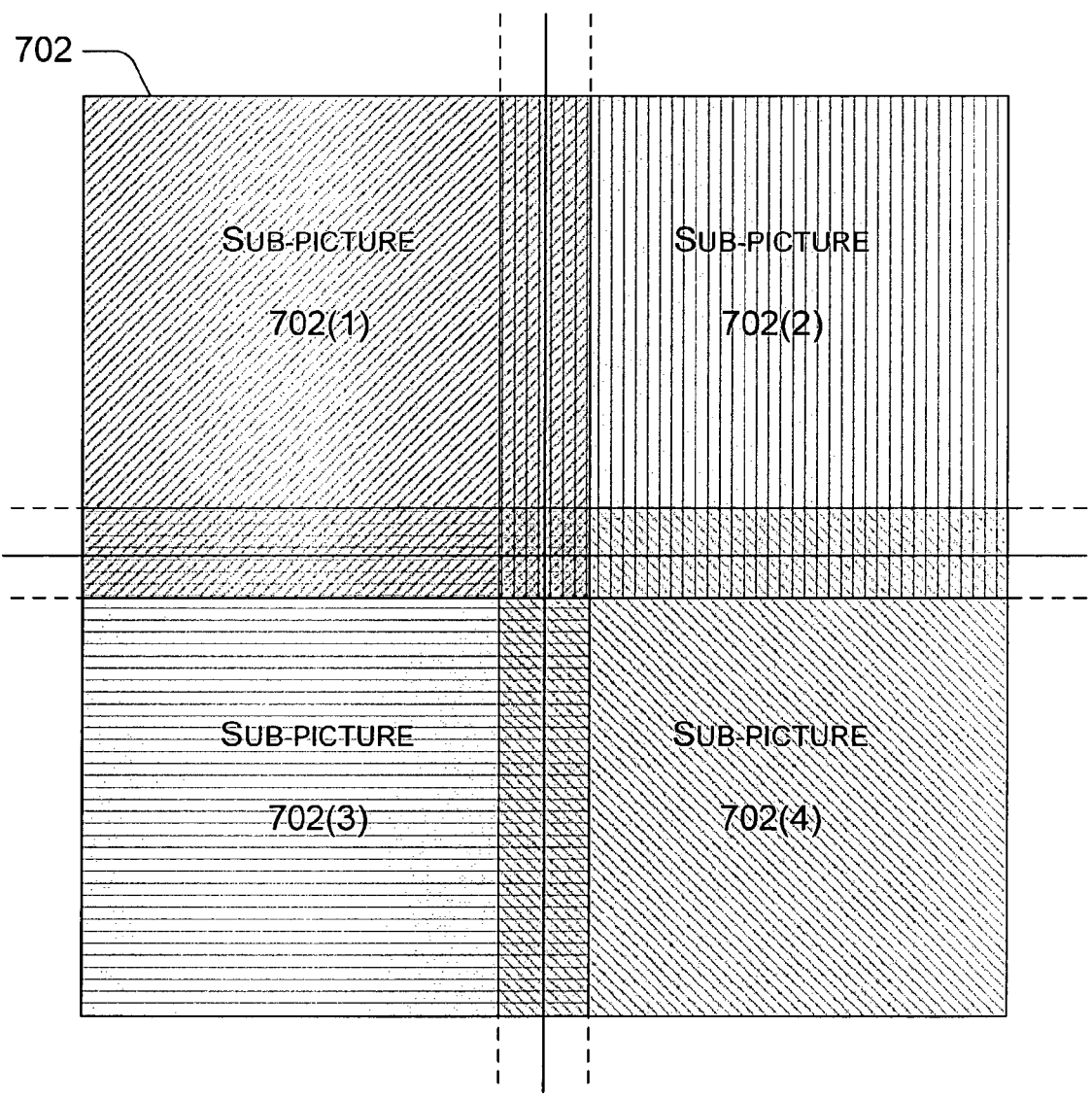
FIG. 7 illustrates exemplary data partitioning to enable video decoding acceleration using a GPU with limited memory resources and limited memory bandwidth.

FIG. 7 illustrates an exemplary large image 702 partitioned into four smaller, overlapping data sets 702(1), 702(2), 702(3), and 702(4). In the illustrated example, large image 702 is divided into four sub-pictures, each equal in size to one-fourth the size of the original image plus a guard band to ensure that motion vectors associated with each sub-picture will not point outside of the picture area. For example, sub-picture 702(1) overlaps sub-pictures 702(2) and 703(3). By partitioning image data into smaller subsets, GPU 208 can be used to accelerate a video decoding process even if the GPU-accessible video memory is limited.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
receiving an encoded video bitstream, the video bitstream comprising intra-coded frame data and inter-coded frame data, wherein the inter-coded frame data comprises multiple intra-coded macroblocks that do not depend on data from a corresponding reference macroblock and multiple inter-coded macroblocks that depend on data from a corresponding reference macroblock;
decoding the intra-coded frame data using a central processing unit;
transferring the intra-coded frame data to a graphics processing unit;
using the graphics processing unit to:
buffer a copy of the intra-coded frame data to be used as reference frame data for the inter-coded frame data; and
transmit the intra-coded frame data to a display device to be displayed;
decoding the inter-coded frame data using the central processing unit;
identifying two or more inter-coded macroblocks of the inter-coded frame data;
packing the two or more inter-coded macroblocks together into a data packet containing only inter-coded macroblocks;
transferring the data packet containing only inter-coded macroblocks to the graphics processing unit; and
using the graphics processing unit to:
apply a motion vector associated with the inter-coded frame data to the reference frame data to generate motion-compensated reference frame data;
reconstruct image data associated with the inter-coded frame data by adding the inter-coded frame data to the motion-compensated reference frame data; and
convert the intra-coded frame data from a first color space to a second color space, the second color space being a color space that is supported by the display device, and the first color space being a color space that is not supported by the display device.

2. The method as recited in claim 1 wherein the decoding the intra-coded frame data comprises performing a variable length decoding process.

3. The method as recited in claim 1 wherein the decoding the intra-coded frame data comprises performing a dequantization process.

4. The method as recited in claim 1 wherein the decoding the intra-coded frame data comprises applying an inverse discrete cosine transformation.

5. The method as recited in claim 1, further comprising:
identifying two or more intra-coded macroblocks of the inter-coded frame data;
packing the two or more intra-coded macroblocks together into a data packet containing only intra-coded macroblocks; and
transferring the data packet containing only intra-coded macroblocks to the graphics processing unit.

6. A method comprising:
receiving an encoded video bitstream, the video bitstream comprising intra-coded frame data and inter-coded frame data, wherein the inter-coded frame data comprises multiple macroblocks wherein each macroblock has an associated motion compensation precision;
decoding the intra-coded frame data using a central processing unit;
ransferring the intra-coded frame data to a graphics processing unit;
sing the graphics processing unit to:
buffer a copy of the intra-coded frame data to be used as reference frame data for the inter-coded frame data; and
transmit the intra-coded frame data to a display device to be displayed; decoding the inter-coded frame data using the central processing unit;
identifying two or more macroblocks, each of the macroblocks having the same motion compensation precision;
packing the two or more macroblocks together into a data packet containing only macroblocks with the same motion compensation precision, wherein the motion compensation precision comprises motion compensation precision to the nearest half-pixel;
transferring the data packet to the graphics processing unit;
using the graphics processing unit to:
apply a motion vector associated with the inter-coded frame data to the reference frame data to generate motion-compensated reference frame data; and
reconstruct image data associated with the inter-coded frame data by adding the inter-coded frame data to the motion-compensated reference frame data.

7. The method as recited in claim 6 wherein identifying two or more macroblocks, each of the macroblocks having the same motion compensation precision comprises:

identifying two or more macroblocks, each of the macroblocks having an associated motion vector equal to zero.

8. The method as recited in claim 6 wherein the motion compensation precision is to the nearest pixel.

9. The method as recited in claim 6 wherein the motion compensation precision is to the nearest quarter-pixel.

10. The method as recited in claim 1 further comprising: using the graphics processing unit to buffer a copy of the reconstructed image data to be used as reference data for subsequent inter-coded frame data.

11. The method as recited in claim 1 further comprising: using the graphics processing unit to convert the reconstructed image data from a first color space to a second color space, the second color space being a color space that is supported by the display device.

12. A method comprising: receiving encoded video data; using a first processing unit to decompress the encoded video data; packing the two or more inter-coded macroblocks together into a data packet containing only inter-coded macroblocks; transferring the data packet containing only inter-coded macroblocks to a second processing unit; and using a second processing unit comprising a graphics processing unit to perform color space conversion processing in association with the video data to convert the intra-coded frame data from a first color space to a second color space, the second color space being a color space that is supported by the display device, and the first color space being a color space that is not supported by the display device.

13. The method as recited in claim 12 wherein the first processing unit is implemented as a central processing unit.

14. The method as recited in claim 12 wherein the first processing unit is implemented as a graphics processing unit.

15. The method as recited in claim 12 wherein the second processing unit is implemented as a graphics processing unit configured to perform vector-based graphics processing operations.

16. The method as recited in claim 12 wherein the second processing unit is implemented as a graphics processing unit configured to perform pixel-based graphics processing operations.

17. The method as recited in claim 12 further comprising: using the second processing unit to perform predicted image reconstruction in association with the video data.

18. The method as recited in claim 12 further comprising: using the second processing unit to perform motion compensation processing in association with the video data.

19. A system comprising: a central processing unit configured to perform a first operation in association with decoding a video bitstream; packing the two or more inter-coded macroblocks together into a data packet containing only inter-coded macroblocks; transferring the data packet containing only inter-coded macroblocks to a graphics processing unit; and the graphics processing unit comprising a programmable pixel shader component configured to perform color space conversion processing in association with decoding the video bitstream to convert the intra-coded frame data from a first color space to a second color space, the second color space being a color space that is supported by the display device, and the first color space being a color space that is not supported by the display device.

20. The system as recited in claim 19, wherein the first operation comprises a video decompression operation.

21. The system as recited in claim 19, wherein the first operation comprises at least one of inverse discrete cosine transformation, dequantization, or variable length decoding.

22. The system as recited in claim 19, wherein the programmable pixel shader component is further configured to perform an image reconstruction operation in association with decoding the video bitstream.

23. The system as recited in claim 19, wherein the graphics processing unit further comprises a programmable vertex shader component configured to perform a motion compensation operation in association with decoding the video bitstream.

24. The system as recited in claim 19 further comprising a buffer for storing decoded video bitstream data.

25. The system as recited in claim 19 further comprising a display device configured to display the video bitstream.

26. A system comprising: a central processing unit; a graphics processing unit; and a video decoding application configured to: direct the central processing unit to perform a first operation in association with decoding an encoded video bitstream; packing the two or more inter-coded macroblocks together into a data packet containing only inter-coded macroblocks; transferring the data packet containing only inter-coded macroblocks to a graphics processing unit; and direct the graphics processing unit to perform color space conversion processing in association with decoding the encoded video bitstream to convert the intra-coded frame data from a first color space to a second color space, the second color space being a color space that is supported by the display device, and the first color space being a color space that is not supported by the display device.

27. A computer-readable memory media having at least one tangible component, the computer-readable media encoded with computer executable instructions that, when executed, cause a computing system to: decompress a received video bitstream using a central processing unit; identify two or more macroblocks, each of the macroblocks having the same motion compensation precision; pack the two or more macroblocks together into a data packet containing only macroblocks with the same motion compensation precision, wherein the motion compensation precision comprises motion compensation precision to the nearest half-pixel; and perform motion compensation and color space conversion processing on the video bitstream using a graphics processing unit.

28. The computer-readable memory medium as recited in claim 27, the computer-readable memory medium further encoded with computer executable instructions that, when executed, cause the computing system to:
in an event that a particular frame of the video bitstream is larger than a maximum data size that can be processed by the graphics processing unit, direct the central processing unit to partition data associated with the frame into overlapping sub-pictures, each of which are smaller than the maximum data size.

29. The computer-readable memory medium as recited in claim 27, the computer-readable memory medium further encoded with computer executable instructions that, when executed, cause the computing system to use the graphics processing unit to apply a bi-linear filter to achieve half-pixel precision in association with the motion compensation processing.

30. The computer-readable memory medium as recited in claim 27, the computer-readable memory medium further encoded with computer executable instructions that, when executed, cause the computing system to use the graphics processing unit to apply a bi-cubic filter to achieve quarter-pixel precision in association with the motion compensation processing.

31. The computer-readable memory medium as recited in claim 27, the computer-readable memory medium further encoded with computer executable instructions that, when executed, cause the computing system to perform image reconstruction using the graphics processing unit.

32. The computer-readable memory medium as recited in claim 31, the computer-readable media further encoded with computer executable instructions that, when executed, cause the computing system to:
reconstruct an image comprising Y, U, and V components such that the Y, U, and V components are arranged on a smallest target texture that is supported by the computer system and that is large enough to hold the Y, U, and V components of the image.

33. The method as recited in claim 6 further comprising:
using the graphics processing unit to convert the intra-coded frame data from a first color space to a second color space, the second color space being a color space that is supported by the display device.

34. The method as recited in claim 6 further comprising:
using the graphics processing unit to convert the reconstructed image data from a first color space to a second color space, the second color space being a color space that is supported by the display device.

35. The method as recited in claim 1 wherein the first color space comprises a YUV format and the second colors space comprises an RGB format.

36. The method as recited in claim 11 wherein the first color space comprises a YUV format and the second colors space comprises an RGB format.

37. The method as recited in claim 12 wherein the first color space comprises a YUV format and the second colors space comprises an RGB format.

38. The method as recited in claim 19 wherein the first color space comprises a YUV format and the second colors space comprises an RGB format.

39. The method as recited in claim 26 wherein the first color space comprises a YUV format and the second colors space comprises an RGB format.

* * * * *